United States Patent
Afzal

(10) Patent No.: US 6,826,258 B2
(45) Date of Patent: Nov. 30, 2004

(54) SYSTEM AND METHOD FOR PRE-QUALIFICATION OF TELEPHONE LINES FOR DSL SERVICE USING AN AVERAGE LOOP LOSS

(75) Inventor: Muhammad A. Afzal, Elk Grove Village, IL (US)

(73) Assignee: Teradyne, Inc., Boston, MA (US)

( * ) Notice: Subject to any disclaimer, the term of this patent is extended or adjusted under 35 U.S.C. 154(b) by 90 days.

(21) Appl. No.: 10/176,014

(22) Filed: Jun. 20, 2002

(65) Prior Publication Data

US 2003/0235274 A1 Dec. 25, 2003

(51) Int. Cl.[7] .......................... H04M 1/24; H04M 3/08; H04M 3/22
(52) U.S. Cl. ................. 379/1.04; 379/27.01; 379/29.01
(58) Field of Search .............................. 379/1.01, 1.03, 379/1.04, 9, 9.04, 15.01, 22, 22.04, 24, 27.01, 29.01, 29.1, 28

(56) References Cited

U.S. PATENT DOCUMENTS

| | | | | |
|---|---|---|---|---|
| 5,956,386 | A | * 9/1999 | Miller | 379/27.02 |
| 6,177,801 | B1 | 1/2001 | Chong | 324/520 |
| 6,215,855 | B1 | * 4/2001 | Schneider | 379/22 |
| 6,226,356 | B1 | 5/2001 | Brown | 379/24 |
| 6,256,377 | B1 | 7/2001 | Murphree et al. | 379/24 |
| 6,266,395 | B1 | 7/2001 | Liu et al. | 379/27 |
| 6,292,468 | B1 | * 9/2001 | Sanderson | 370/241 |
| 6,366,644 | B1 | 4/2002 | Sisk et al. | 379/1.04 |
| 6,385,297 | B2 | * 5/2002 | Faulkner et al. | 379/1.04 |
| 6,456,694 | B1 | * 9/2002 | Posthuma | 379/1.04 |
| 6,459,773 | B1 | * 10/2002 | Posthuma | 379/1.04 |
| 6,463,126 | B1 | * 10/2002 | Manica et al. | 379/27.01 |
| 6,466,647 | B1 | * 10/2002 | Tennyson | 379/1.04 |
| 6,487,276 | B1 | * 11/2002 | Rosen et al. | 379/1.04 |
| 6,625,255 | B1 | * 9/2003 | Green et al. | 379/1.04 |
| 6,643,266 | B1 | * 11/2003 | Pugaczewski | 370/249 |
| 6,668,041 | B2 | * 12/2003 | Kamali et al. | 379/1.04 |
| 6,687,336 | B1 | * 2/2004 | Holeys | 379/1.04 |
| 6,741,676 | B2 | * 5/2004 | Rudinsky et al. | 379/27.04 |

FOREIGN PATENT DOCUMENTS

| | | | |
|---|---|---|---|
| WO | WO 00/27134 | 5/2000 | |
| WO | WO 00/64132 | 10/2000 | ............ H04M/3/00 |
| WO | WO 01/01597 | 1/2001 | ............ H04M/3/46 |
| WO | WO 01/24490 | 4/2001 | ............ H04M/3/22 |
| WO | WO 01/67729 | 9/2001 | ............ H04M/3/30 |

* cited by examiner

*Primary Examiner*—Binh Tieu
(74) *Attorney, Agent, or Firm*—Teradyne Legal Department

(57) ABSTRACT

A system and method for testing lines in a network. The system and method are described in connection with a system for use with a telephone network to aid a network operator determine whether the any line can support high speed data services. According to the method, a mapping is created between low frequency measurements and average loop loss over a high frequency range. The average loop loss is sued to compute the equivalent working length of a line, which is an industry standard measure of the ability of a line to support high speed data services.

20 Claims, 8 Drawing Sheets

SYSTEM AND METHOD FOR PRE-QUALIFICATION OF TELEPHONE LINES FOR DSL SERVICE USING AN AVERAGE LOOP LOSS

CROSS-REFERENCES TO RELATED APPLICATIONS

Not Applicable.

STATEMENT REGARDING FEDERALLY SPONSORED RESEARCH OR DEVELOPMENT:

Not Applicable.

Reference to Microfiche Appendix:

Not Applicable

BACKGROUND OF THE INVENTION

1. Field of the Invention

This invention relates generally to data transmission networks and more particularly to determining the data rates of a telephone network used for high speed data services.

2. Description of Related Art

With the recent growth in the use of the internet and expansion of small and home offices, there has been a great demand for high speed data services at numerous premises. Many phone companies have responded to this demand by offering DSL services over their existing telephone lines. DSL stands for "Digital Subscriber Loop."

DSL services allow information to be transmitted over the phone line in digital form. With the digital encoding used in a DSL system, the number of bits that can be transmitted through a phone line is much greater than with a traditional analog modem. An analog modem provides a carrier signal that is modulated with the bits that represent the digital information. Modulation can be in amplitude, frequency or phase.

Because the modulating information is digital, the carrier can be modulated into one of several states. To transmit one bit at a time, the carrier only needs to be modulated into one of two states, with one state signaling that the bit has a 0 value and the other state signaling that the bit has a 1 value.

If it is desired to transmit more than one bit at a time, the carrier can be modulated into more than two states. For example, if the carrier is modulated into one of four states, two bits can be transmitted at one time. For three bits, eight modulation states are required. Whatever modulation scheme is used, a modem at the receiving end of the line detects the modulation state of the carrier and outputs a group of bits that have a value assigned based on the modulation state.

Generally increasing the number of modulation states of the carrier increases the rate at which bits can be communicated through the channel. However, the number of bits that can be simultaneously transmitted can not be set arbitrarily large. As the number of modulation states increases, the difference between each modulation state gets smaller. The less difference there is between the modulation states, the more likely it is that noise in the communication channel will disrupt communication. Noise can make a signal in one modulation state look as it is was modulated into a different state and the receiving modem will associate the signal in that channel with the wrong modulation state. Thus, the number of bits that can be simultaneously communicated on one carrier is limited because of the noise in the communication channel.

The number of bits that can be transmitted over a communication channel is also dependent on the attenuation in that channel. If the signal is attenuated, there is less energy available for the receiving modem to distinguish between the signal and the noise. Thus, the bit rate of a channel is also limited by the amount of attenuation in the channel.

To determine what bit rate can be supported, a conventional analog modem often goes through a "training sequence." A modem attempting to initiate a connection to another modem will often try to transmit with several different modulation schemes. The modulation scheme that provides the highest bandwidth is selected for communication between those two modems.

A DSL system operates on a principle that is similar to a traditional analog modem. However, a DSL system may use multiple carrier frequencies. As part of the training sequence, the modem determines the number of modulation states that each carrier signal can carry. Those carrier frequencies that have a high attenuation or that have a lot of noise will be assigned a small number of modulation states. Some frequencies might not be used for communication at all, if they are too noisy or have too much attenuation.

A second difference between DSL and a traditional analog modem is that many of the carrier frequencies used by the DSL modem are at higher frequencies than used in a traditional analog modem. Having higher frequency signals allows more carrier signals in one phone line and therefore more bits to be simultaneously transmitted. However, traditional telephone lines were designed for voice signals that have a frequency range below approximately 20 kHz.

While most telephone lines can carry signals at frequencies higher than 20 kHz, the attenuation of a line generally increases with frequency, which limits the bit rate that can be transmitted through the line. Not all telephone lines have the same attenuation characteristics. Some lines will be able to carry enough high frequency signals that they can support DSL service at bit rates of many hundreds of kilobits per second. Others will be able to support DSL service, but at lower bit rates. Still others will not be able to carry enough high frequency signals that they could meet the lowest level of what would be considered acceptable as a high speed data service.

To offer DSL services, it is important for the phone company to know before it connects a particular subscribed for DSL service, whether the lines running to that subscriber's premises will support high speed data services. And, if the telephone company offers different service levels for DSL service based on the data rate selected by the customer, it is important for the phone company to know whether the lines support the minimum bit rate associated with the selected service level.

Therefore, there is a need for the telephone company to "prequalify" a subscriber line for high speed data services. "Prequalification" means that the telephone company determines, with a reasonable degree of certainty, that the line will support DSL service at the selected data rate and that this qualification is made before the service in installed.

One simple way that prequalification has been done is through the use of a technician in the field. A technician might actually go to the subscriber premises and attach measurement equipment to the far end of the subscriber line. Through a series of interactions with test equipment at the near end of the line, the technician could determine the data rate that could be supported.

Traditionally, the attenuation of the line at 300 kHz is used as a metric to pre-qualify subscriber lines. Though DSL service operates with multiple carrier frequencies that might range from 10 kHz to over 1 MHz, a large portion of the data transmitted at any time is generally done so on carriers with frequencies near 300 kHz. Further, the performance of the line at higher frequency is usually correlated to its performance at 300 kHz, so knowing performance at that frequency often allows an acceptable prediction of performance to be made across the full frequency spectrum.

However, sending a technician to the far end of the line to measure attenuation can be costly. Most telephone companies prefer a pre-qualification approach that does not require two-ended measurements.

An alternative approach to doing pre-qualification is to make an estimate of the length of the subscriber's phone line because attenuation of a line is heavily influenced by the length of the line. Phone companies have developed a relationship between what is called Equivalent Working Length (EWL) and the data rate for DSL services the phone line will provide. The EWL is defined in ANSI standard T1.417-2001 Spectrum Management for Loop transmission Systems.

Techniques for making estimates of EWL without two-ended measurements have been used. One approach is to estimate the length of the line from installation information. Some simple techniques use geographic location of the subscriber in relation to the switch to which their subscriber line is connected. A simple way to estimate the subscriber's location is through the use of postal codes. The post office assigns codes based on geography, making it possible to estimate distance between the subscriber and the switch.

Use of postal codes is not, however, very accurate. The postal code only gives an approximation of distance. If the line travels a circuitous route between the switch and the subscriber, there could be significant differences between the pre-qualification prediction of performance and actual results. Likewise, if the line has anomalies on it, such as if it is made of a smaller gauge wire than a nominal subscriber line or contains bridged taps or load coils, there could be a significant difference between the actual performance and the performance as predicted by the line length estimate.

A variation on the approach of pre-qualifying a line through postal codes is to use cable records of the telephone company. Most telephone companies have records that indicate the construction of their network. From these records, the EWL of the line might be determined. However, it has been found that many telephone company records are not up to date. Repairs or changes in the wiring sometimes does not get accurately recorded in the database. And, at some telephone companies, the cable records are partially or totally kept in paper form, making it very time consuming to locate the required information.

A further variation in using line length to pre-qualify lines for DSL service is to measure the capacitance of the line and use the measured capacitance to predict the line length. The capacitance of a line will increase as the line length increases. However, factors other than line length also influence the capacitance of the line. For example, the thickness of the wire used to make the line and the number of bridged taps on the line can influence capacitance, but usually do not have a proportionate impact on the attenuation of signals carried by the line. As a result, estimation of DSL performance of a line based on measured capacitance is not as accurate as desired.

There are other non-capacitance based techniques (such as TDR) to measure loop length for line qualification. These methods suffer from limitations similar to above mentioned capacitance based length measurement. The TDR length is also not as accurate as capacitance based length.

An improved approach to pre-qualification is with a product called Celerity™, sold by Teradyne, Inc. of Deerfield, Ill., USA. That system provides a measurement unit that is attached to multiple subscriber lines through a telephone company switch. Telephone switches have traditionally been designed to allow test access to the subscriber lines. However, the test access port of telephone switches has a low frequency response meaning that only relatively low frequency signals can be coupled through the switch between the measurement unit and a particular subscriber line under test. Generally, the test access of a telephone switch can reliably pass signals up to around 20 KHz. However, a DSL system often uses signals over 1 MHz. And, even when the EWL is computed from attenuation at a particular frequency, that single frequency is likely to be in the 100 kHz to 300 kHz range. In addition to requiring a single ended measurement technique, there is a particular challenge making a single ended measurement through a switch, which limits the range of frequencies that can be used for the measurement to be below the frequency at which attenuation needs to be measured.

The Celerity™ pre-qualification system has solved this problem. It uses a range of techniques using low frequency measurement signals to pre-qualify a line for high speed data services. The maker of that product, Teradyne, Inc., is the assignee of several patents and patent applications relating to line pre-qualification. PCT application WO 01/67729, entitled "Technique for Estimation of a Subscriber Line Insertion Loss" describes a technique to estimate insertion loss at a single frequency. Insertion loss can be directly related to line attenuation. The maker of that product also owns the following patents and applications: PCT application WO 00/27134 entitled "Method and Apparatus for Qualifying Loops For Data Services"; PCT application WO 00/64132 entitled "Predicting Performance of Telephone Lines for Data Services"; PCT application WO 01/01597 entitled "Qualifying Telephone Lines for Data Transmission"; and PCT application WO 01/24490 entitled "Subscriber Line Qualification with Numeral Networks with Respect to Data Transmission Characteristics." The foregoing patents and applications are all hereby incorporated by reference.

BRIEF SUMMARY OF THE INVENTION

With the foregoing background in mind, it is an object of the invention to provide an improved technique to pre-qualify a line for high speed data services using one-ended measurements.

To achieve the foregoing object, as well as other objectives and advantages, a system is provided that uses low frequency measurements on a telephone line to predict line attenuation at multiple high frequencies and then providing a more accurate characterization of the line based on an average loop loss.

BRIEF DESCRIPTION OF THE SEVERAL VIEWS OF THE DRAWINGS

Additional objects, advantages, and novel features of the invention will become apparent from a consideration of the ensuing description and drawings, in which.

DETAILED DESCRIPTION OF THE INVENTION

Figure 1:
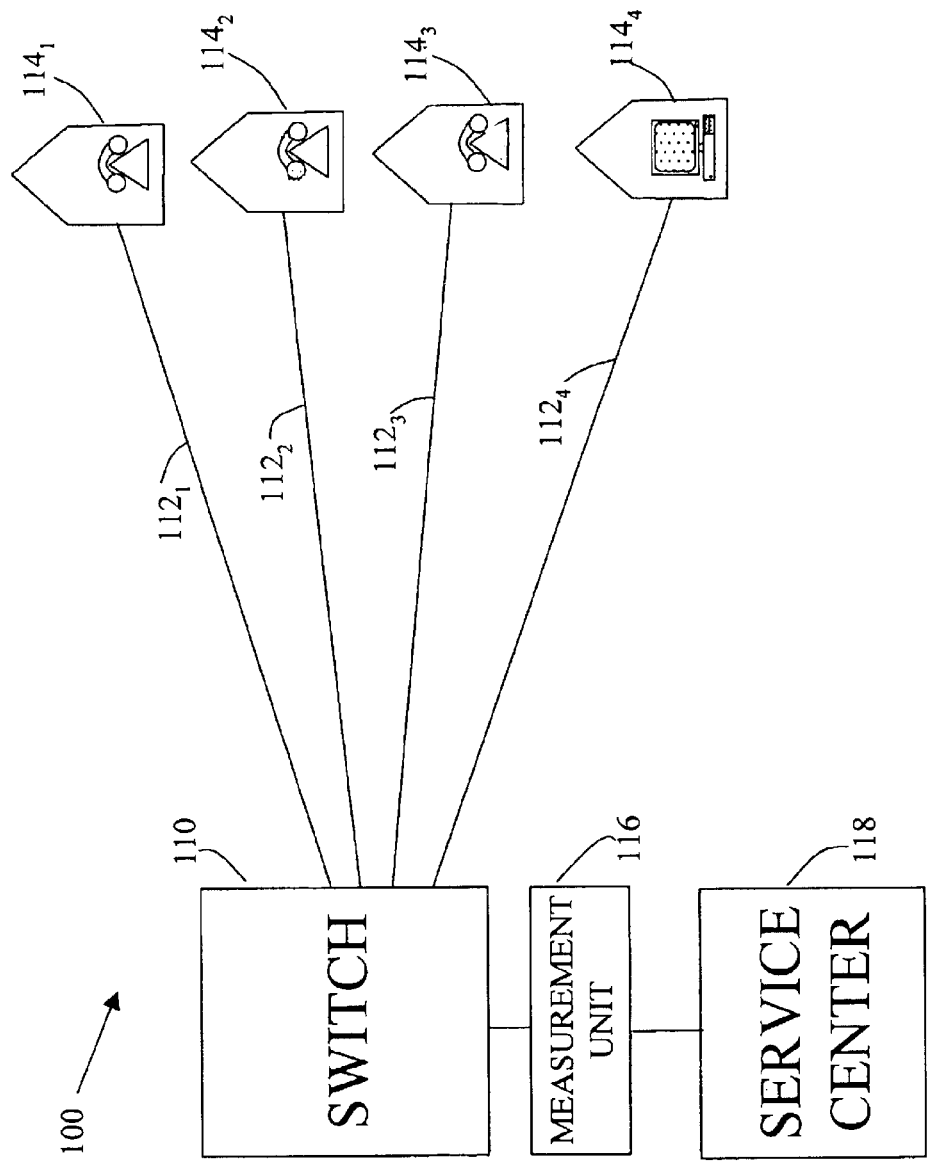
FIG. 1 is an illustration of a prior art system for loop qualification.

FIG. 1 shows a prior art communication network 100, which could represent the access network of the public switched telephone network. Network 100 contains switch 110 that connects to a plurality of subscriber lines $112_1 \ldots 112_4$. Switch 110 connects selected ones of the subscriber lines $112_1 \ldots 112_4$ to other locations within the network to establish a communication path. For example, switch 110 might connect to a trunk line that is in turn routed to another switch. For simplicity, the preferred embodiment of the invention will be described in connection with the access network, though it will be appreciated that the invention might be used in other areas of the network or on other types of networks.

Subscriber lines $112_1 \ldots 112_4$ run to a plurality of subscriber premises $114_1 \ldots 114_4$. Subscriber premises $114_1 \ldots 114_3$ are shown to be receiving standard telephone services through network 100. Subscriber premises $114_4$ is shown to be receiving digital data services through network 100. Subscriber premises $114_4$ would like to receive high speed data services through subscriber line $112_4$. The challenge for the network operator is to determine whether subscriber line $112_4$ is qualified to carry high speed data services at the service level desired by the subscriber.

To determine whether any particular subscriber line is qualified for data services, network 100 includes a measurement unit 116. Measurement unit 116 makes electrical measurements that can be used to determine, as described below, whether a subscriber line can support a certain level of data services. Measurement unit 116 is a measurement unit as known in the art and can, in response to computer commands, measure current or voltage and can also provide current or voltage stimulus signals. These signals can be sourced and measured over a range of frequencies. With these capabilities, various electrical properties of a subscriber line connected to measurement unit 116 can be measured. For example, capacitance and power dissipation in the line can be determined.

Measurement unit 116 is connected to switch 110. Switch 110 can then connect measurement unit 116 to any one of the subscriber lines $112_1 \ldots 114_4$. In a preferred embodiment, switch 110 is a switch of the type traditionally used in the public switched telephone network. Such switches have a test access port that allows test signals to be coupled to the subscriber lines. Generally, such test access ports have a limited bandwidth, up to around 20 kHz. Thus, the range of frequencies over which measurement unit 116 generates and measures signals is preferably limited to fall within the bandwidth of the path through switch 110.

Measurement unit 116 receives commands from and provides data back to service center 118. Likely, an entire network contains many access networks of the type shown in FIG. 1. Likely, a measurement unit 116 will be coupled to each access network. However, the overall control of any testing is likely done at a service center that connects to many access networks.

Service center 118 contains computers (not numbered) that are programmed to make measurements on specific subscriber lines, either in response to a human operator's request or on regularly scheduled basis. At the service center, that data is analyzed. One way that the data is analyzed is to predict whether a particular line is qualified for high speed data services.

One way that line qualification has been done is by predicting either the line attenuation or the EWL. A technique for more accurately determining line attenuation and also for predicting EWL is described.

Figure 2:
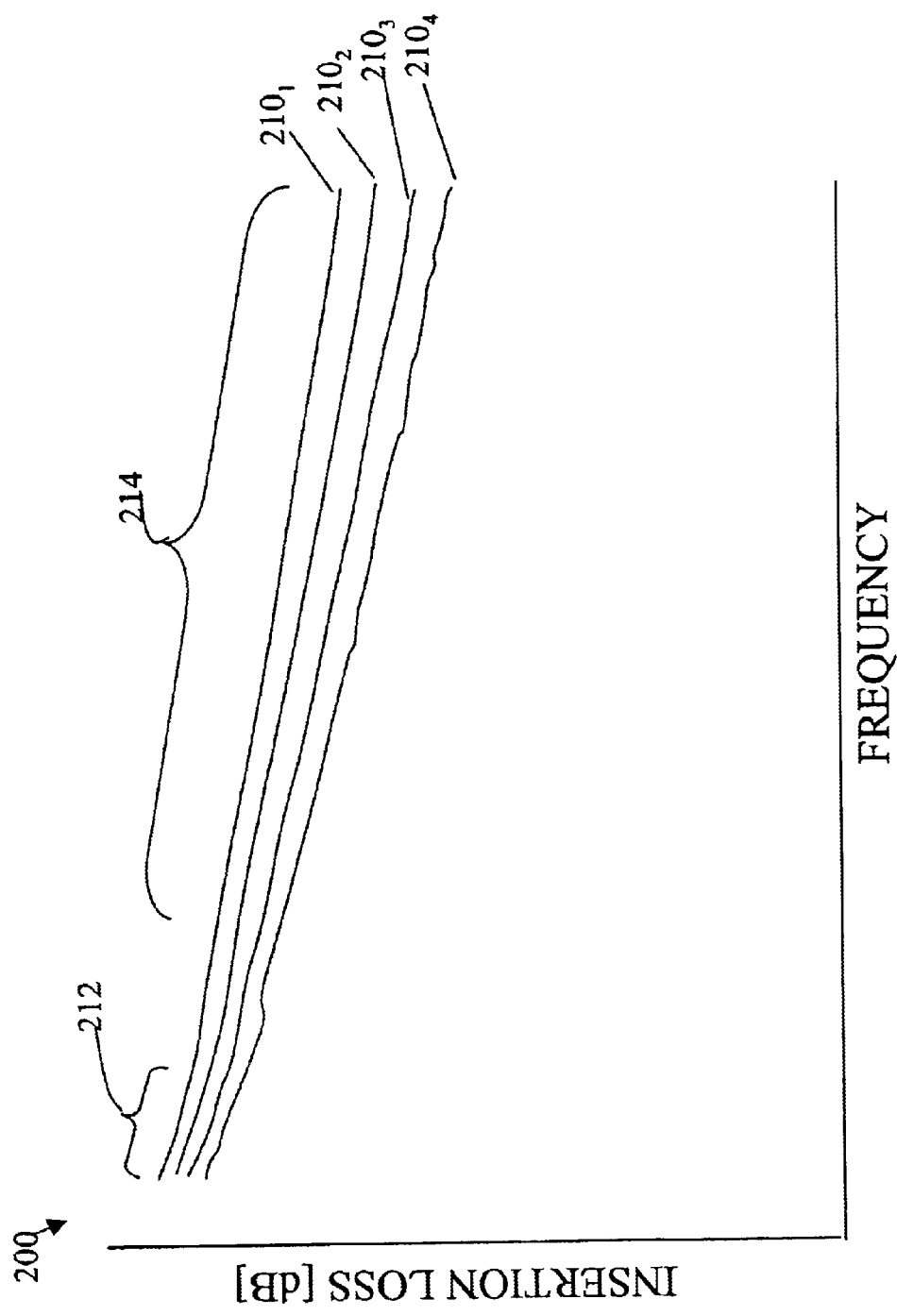
FIGS. 2 and 2A are graph sillustrating insertion loss as a function of frequency for a plurality of lines of different lengths.
Figure 2A:
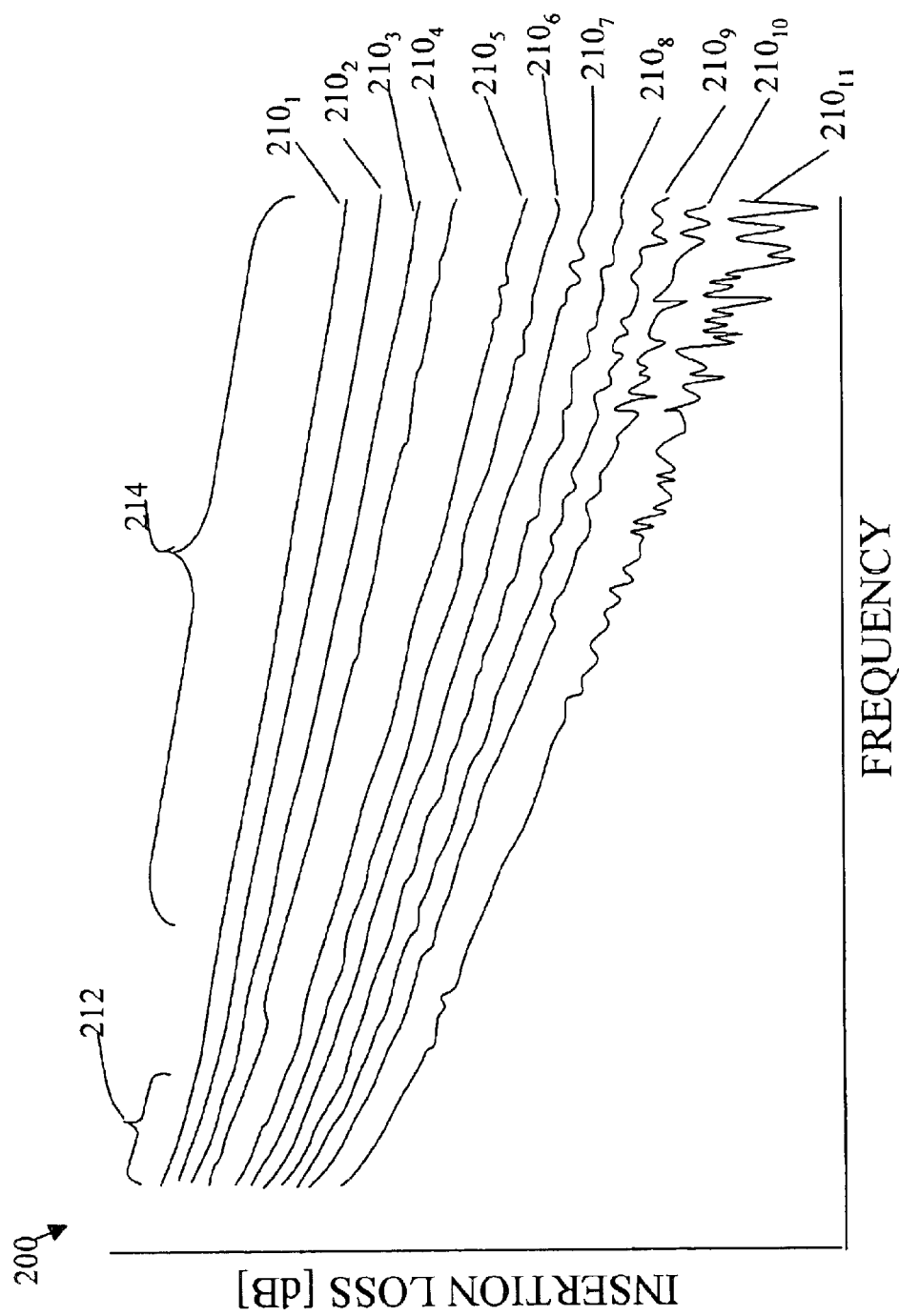

FIG. 2 shows the basis for the technique of predicting loop loss. FIG. 2 shows a graph 200 depicting insertion loss as a function of frequency on a plurality of subscriber lines. Insertion loss and attenuation are different ways of expressing the loss in the line. The precise expression of that loss is not important to the invention. The data in FIG. 2 is used in developing specific numeric values that predict EWL.

Each of the curves $210_1 \ldots 210_{11}$ represents the insertion loss as a function of frequency of a line of a different length. As pictured, the lines used to create the curves $210_1 \ldots 210_{11}$ successively increased in length such that the insertion loss increases for each line. The specific lengths of the lines depicted in FIG. 2 as well as the frequency range over which the loss measurements are made are preferably selected based on the characteristics of the access network in which a line qualification system according to the invention will be deployed. For example, if most subscriber lines in an access network are between 2 and 6 kilometers, FIG. 2 would preferably be created with multiple curves representing lines of length varying from 2 to 6 kilometers.

The increments in line length used to create the successive curves in FIG. 2 is also not critical to the invention. Preferably, there will be a sufficient number of curves to give a complete picture of line performance regardless of line length. However, there should not be so many curves that data analysis becomes difficult. Line increments of approximately 0.5 kilometers were used in creation of FIG. 2.

Further, the frequency range over which data is collected also preferably depends on the specific network in which the line qualification will be collected. Different network operators might offer different types of high speed data services that use different frequency spectra. For example, if a particular network provider wished to provide a high speed data service that employed a frequencies up to 500 kHz, FIG. 2 would preferably show attenuation over a frequency range up to about 500 kHz.

It should be appreciated that FIG. 2 is a graphical representation of data which is convenient for conceptual understanding. It is not necessary that the data be depicted graphically. Comparable data might be captured in a table, an equation or other convenient form.

The data depicted in FIG. 2 typifies lines in an access network in which the qualification system will be deployed. The data might be taken from actual measurements on lines that model those in the access network. The model lines might be created in a laboratory environment. Alternatively, the model lines might be a subset of lines in the actual network that have been measured. As another example, the data might be gathered from actual measurements on other networks that are expected to have similar operating characteristics to the network to be qualified. Or, the data might be generated from mathematical models of lines based on expected physical characteristics of lines in the network. In the preferred embodiment, the data in FIG. 2 is acquired from two-ended measurements created in a laboratory environment.

The data in FIG. 2 can be thought of as spanning multiple frequency ranges. Frequency range 212 represents the range of frequencies over which measurement unit 116 can reliably make measurements through switch 110. Frequency range 214 represents the range of frequency over which data is transmitted for the particular high speed data service of interest. For example, in a typical ADSL network, data in the downstream link might span a frequency range of approximately 168 kHz to 1.1 MHz. Frequency range 214 represents this frequency range.

If a particular data service involves multiple frequency ranges, an additional frequency range might be employed. Processing of that frequency range would be similar to the processing of frequency range 214. For example, ADSL service has separate upstream and downstream frequency ranges. It might be desirable to separately predict loss for the upstream frequency range and the downstream frequency range, which would allow a network operator having separate predictions for data rates in the upstream and downstream channels. For simplicity, line qualification based on just one frequency range will be described, but the technique can also be applied in multiple ranges.

It should be noted in the illustrated embodiment that frequency range 212 and frequency range do not overlap. Frequency range 214 extends significantly beyond the range of frequencies where measurements on any particular line can be made with measurement unit 116. Thus, to use the system of FIG. 1 for line qualification, it is necessary to correlate measurements made in frequency range 212 to line performance in frequency range 214.

The prediction of line performance will be made based on an "Average Loop Loss" (ALL). ALL is a mathematical combination of the loop loss or insertion loss at each carrier frequency in range 214, i.e. the average loss at the frequencies used to carry DSL data.

Computing ALL for the lines depicted in FIG. 2 is straightforward. The data provides a series of insertion loss values at different frequencies. Those loop losses can be expressed as $$P(f_k)[dB], k=1,2,\ldots$$

To compute ALL over range 214, it is simply necessary to select the N data values representing loss in frequency range 214 and average those values, according to the equation:

$$ALL[Watts]=(1/N)\Sigma 10^{P(fk)/10} \quad \text{EQ (1)}$$

The sum is computed over the N values of P(fk) in the frequency range 214. However, a possible refinement on the computation is to exclude from the average those values that represent such a large attenuation that data would not be transmitted at that frequency. For example, any tone at which the attenuation is greater than −85 dB might be excluded as it is unlikely that any data would be carried by a tone with such a large attenuation.

Thus, each of the curves $210_1 \ldots 210_{11}$ can have an ALL value associated with it characterizing data transmission in frequency range 214. To use this information on actual measurements taken on lines in a network, it is necessary to be able to map values in frequency range 212—where measurements can actually be made—to ALL that represents performance in frequency range 214.

Several observations can be made about the data in FIG. 2 to aid in making the mapping between low frequency data and high frequency data. One observation is that, with the exception of noise that is more pronounced at higher attenuations, the loss is a monotonically decreasing function of frequency. Secondly, the rate at which the loss decreases as a function of frequency is not the same for all line lengths. For longer lines, the rate of decrease is faster.

From these observations, we have concluded that a by using appropriate coefficients to scale and offset values in low frequency range 212, an accurate prediction of performance could be made in frequency range 214. However, the appropriate coefficients used to scale and offset the low frequency values could depend on the length of the line. Therefore, in a preferred embodiment, we derive multiple sets of coefficients.

In the most preferred embodiment, we derive five sets of coefficients. Three of the sets of coefficients are appropriate for use on lines that are short, medium and long. The remaining two sets of coefficients are useful in determining whether a set of measurements indicates it was made on a short, medium or long line. These will be course-short and course-long coefficients.

The mapping used to determine the insertion loss at a particular frequency, f, from a set of measurements can be thought of as of the form of equation 2:

$$ALL=\alpha_i\Sigma_1+\beta_i\Sigma_2+C_i \quad \text{EQ.2}$$

The terms $\alpha_i$, $\beta_i$ and $C_i$ are the coefficients determined from the data depicted in FIG. 2. In the preferred embodiment, there will be five values of i such that there is a set of coefficients for each frequency, f—one set for short lines, medium lines, long lines and one set for the course short and course long computations.

The terms $\Sigma_1$ and $\Sigma_2$ represent quantities computed from the data in frequency range 212. It should be appreciated that, though the curves in FIG. 2 are drawn as continuous curves, actual measurements will likely be made at a plurality of discrete frequencies. $\Sigma_1$ and $\Sigma_2$ represent combinations of different discrete values.

$\Sigma_1$ corresponds to the average power dissipated in the line at one sub-set of measured frequencies in range 212. In a preferred embodiment, measurement unit 116 measures the voltage across a line under test at 45 separate frequencies in frequency range 212. $\Sigma_1$ is derived from values at frequencies corresponding to a subset of these frequencies.

The lowest frequency measurement is taken as a reference power level to normalize the average. Thus, $\Sigma_1$ equals the average insertion loss of the first selected subset, normalized by the insertion loss at the lowest frequency. This computation is described for insertion loss in Watts. The logarithm (base 10) is then taken to covert the result to decibels. However, an equivalent computation could be performed with losses expressed in decibels.

$\Sigma_2$ is computed in a similar fashion and represents a combination of measurement points. However, a different sub-set of points in range 212 is selected and a different reference value is selected to normalize this average. The precise reference value used to normalize this average is not important. Changing the reference value will cause a corresponding change in the value of $\beta_i$. However, only the product of these terms is used in EQ. 2, which does not depend on the specific reference value selected.

Our experience has shown that the type of switch in the network for which the data is collected will influence the results. Therefore, the precise number of points used to compute $\Sigma_1$ and $\Sigma_2$ are preferably selected empirically to give a good correlation between measurement frequency. We have determined that for network using a 5ESS switch, two points in addition to the reference in addition to the point used for a reference are sufficient to compute $\Sigma_1$ and $\Sigma_2$. However, for a DMS100 switch, 2 and 14 points, respectively, are used.

To determine specific values of $\alpha_i$, $\beta_i$ and $C_i$, a sub-set of the curves in FIG. 2 is selected based on the value of i. For example, FIG. 2B shows a subset of curves that might be used to compute $\alpha_i$, $\beta_i$ and $C_i$, when i=1, i.e. for short lines. Values of $\alpha_i$, $\beta_i$ and $C_i$, are selected that minimize the error in computing ALL using EQ. 2 for all of the lines in the subset. Various numeric techniques are known for determining a set of coefficients to minimize error. Such techniques can be found in commercially available numerical analysis software packages. For example, Reduced Gradient optimization was used in the preferred embodiment. But, techniques such as least squares or other optimization techniques might also be used.

To compute $\alpha_i$, $\beta_i$ and $C_i$, when i=2 . . . 5, i.e. for medium, long and course-short and course-long scenarios, different subsets of lines might be used. For example, for medium lines, curves $210_5$ . . . $210_8$ might be used; for long lines curves $210_9$ . . . $210_{11}$ might be used; for course-short curves $210_1$ . . . $210_6$ might be used; and for course-long curves $210_7$ . . . $210_{11}$ might be used. In this way, a full set of coefficients can be developed to map low frequency values from range 212 to a specific value for ALL.

As described above, measurement unit 116 can make measurements in range 212, but not over the full range needed to compute ALL. Therefore, in use, these coefficients will be programmed into the computer in service center 118. Measurement unit 116 will take measurements of a particular line under test. Those measurements will be at the same frequencies used to compute the values of $\Sigma_1$ and $\Sigma_2$ that were used in creating the mapping above. Thus, the coefficients can be applied to the values of $\Sigma_1$ and $\Sigma_2$ computed from the measurements to assign an ALL value to the line under test.

More particularly, in the described embodiment, as part of the qualification of a particular line, measurement unit 116 drives a voltage on a particular line and measures the voltage drop across the line. In this scenario, the line can be thought of as a load on the voltage source. From basic circuit theory, the power dissipated in a load is proportionate to the square of the voltage across that load. Thus, the voltage across the line is an indicator of power dissipated in the line.

Each voltage measurement is a complex number, with an in-phase component and a quadrature phase component. Dissipated power is proportional to the square of the magnitude of the voltage, which can be computed as the sum of the squares of the two components. Thus, from simple measurements made by measurement unit 116, the loss on a line under test can be determined at the frequencies need to compute $\Sigma_1$ and $\Sigma_2$.

Turning to FIG. 3, a flowchart of a line qualification is given. The qualification starts in response to business conditions. For example, a network operator might periodically want to monitor lines to verify that they are supporting DSL services at a rated speed. Or, the network operator might wish to have a list of lines that can support DSL services in the event that a subscriber requests such service. Alternatively, the network operator might wish to test a line before connecting a particular subscriber for data services. Regardless of the event that triggers the need to test a line, the testing process will be similar.

The computer in service center 118 will issue commands to switch 110 and measurement unit 116 that connect measurement unit to a particular line under test. Measurement unit 116 will then make measurements on the line. These measurements are then passed back to the computer in service center 118 for processing. Herein, the processing of the results will be described without explicit reference to making the measurements. However, it should be appreciated that the measurements are being made in accordance with prior art techniques or other suitable measurement techniques.

At step 310, the length of the line under test is estimated. This step can use a prior art length estimation technique, such as a capacitive measurement. The measurement at step 310 is intended to be a course estimate. Thus, it is not necessary that a highly accurate line length estimate be made.

At step 312, a check is made as to whether the length of the line, as estimated in step 310, is in the range the ALL technique is required. Very short lines will have a low attenuation and therefore can be qualified without extensive processing. On the other hand, very long lines will not qualify for high speed services and further processing would be to no avail.

Step 312 compares the rough estimate of line length to a low and a high threshold. For example, if the line is shorter than 6,000 feet (1.76 kM), processing might be terminated with a report that the ALL of the line is less than 30 dB. If the line is longer than 19,000 feet (5.6 kM), processing can be terminated with a report that ALL of the line is greater than 70 dB. This pre-sorting step is optional, but is preferably used to improve the accuracy of the ALL estimate. The specific length thresholds and reported attenuations might vary, depending on the network configuration and the type of data services for which the line is being qualified.

At step 314, the line length measured at step 310 is used for further branching. If the line length is short, the process proceeds to step 320, where an ALL computation refined for short lines is employed. On the other hand, if the measured length indicates that the line is long. The process proceeds to step 322, where processing geared to long lines continues. In the preferred embodiments, lines shorter than 8,000 feet (4.5 kilometers) are considered short. Lines longer than 13,000 feet (7.3 kilometers) are considered long.

For lines having an estimated length between short and long, processing proceeds to step 316. At step 316, an estimate of the ALL of the line under test is made. Measurements made by measurement unit 116 are used to compute values of $\Sigma_1$ and $\Sigma_2$ for the line under test. These values are combined with the values of $\alpha_1$, $\beta_i$ and $C_i$, developed for the course-short scenario to compute a value of ALL according to EQ. 2.

At step 318, the course estimate of ALL is used to select the next processing step. If the course estimate of ALL is low in the range of losses, the line under test is likely short. If the estimate is high in the range, the line under test is likely long. Therefore, if the course estimate is low, processing proceeds to step 320. If the attenuation is high, processing proceeds to step 322. In a preferred embodiment, a threshold of 50 dB is used to identify attenuation low in the range.

If processing has been diverted to step 320, this indicates that the line under test is likely have an attenuation profile similar to one of the shorter curves $210_1$ . . . $210_4$ in FIG. 2. Thus, the values of $\alpha_i$, $\beta_1$ and $C_1$, developed for the short scenario are used to compute ALL. Measurements made by measurement unit 116 are used to compute values of $\Sigma_1$ and $\Sigma_1$ for the line under test. These values are combined with the values of $\alpha_i$, $\beta_i$ and $C_1$, developed for the short scenario and a value of ALL is computed according to EQ. 2. The results of that computation are reported as the ALL of the line under test and this phase of the processing is completed.

If processing has been diverted to step 322, the line under test likely has an attenuation profile that resembles one of the medium or long lines shown in FIG. 2. Thus, step 322 uses the coefficients of $\alpha_i$, $\beta_i$ and $C_i$, developed for the course-long scenario to compute ALL in accordance with EQ. 2.

At step 350, a check is made whether the ALL predicted with the course-long coefficients is low in the range of attenuations that might be appropriate for a medium or long line. If the attenuation is low in the range, the line under test is likely a medium length line and processing proceeds to step 352. If not, the line is likely a long line, and processing proceeds to step 354. In a preferred embodiment, an ALL of 57 dB is used to distinguish between a medium and a long line.

If the line is a medium line, step 352 applies EQ. 2 using the measured values on the line and the coefficients of $\alpha_i$, $\beta_i$ and $C_i$, developed for the medium scenario to compute ALL. The results of that computation are reported as the ALL of the line under test and this phase of the processing is completed.

If the line is a long line, step 354 applies EQ. 2 using the measured values on the line and the coefficients of $\alpha_i$, $\beta_i$ and $C_i$, developed for the long scenario to compute ALL. The results of that computation are reported as the ALL of the line under test and this phase of the processing is completed.

Once the ALL of the line under test is determined, this value may be reported directly to a human operator, such as through the user interface of the computer that is part of service center 118.

Or, the value of ALL might be used to predict the performance of the line for data services. The computer in service center 118 might be programmed with data to map ALL to the data rate that could be transmitted if frequency range 214 is used by a particular type of DSL service. For example, the computer that makes up service center 118 might be programmed with a mapping between ALL and the downstream data rate for ADSL service. The computer that makes up part of service center 118 or a human operator might then compare the predicted data rate to the data rate advertised by the network operator for various classes of ADSL services. For each class of service having a lower data rate than the predicted service, the line would be reported as "qualified."

Note that this type of qualification can occur with single ended measurements made through the switch. Thus, it is well suited for pre-qualification of lines.

Alternatively, the ALL predicted for a particular line might be converted to an industry standard measure of the line performance. For example, the ALL might be translated into the equivalent working length (EWL) of the line.

Figure 4:
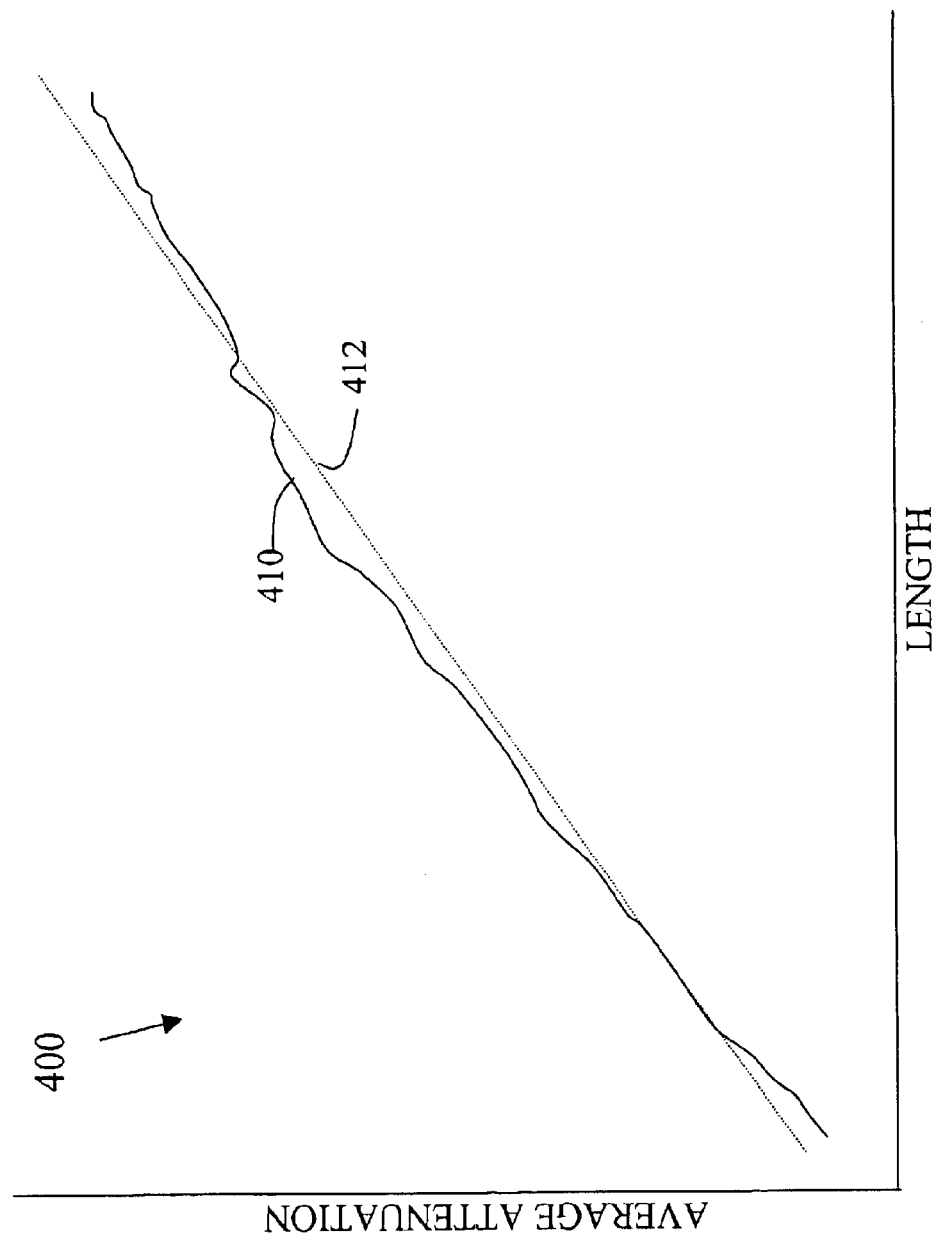
FIG. 4 is a graph illustrating a mapping between average loop loss and equivalent working length.

FIG. 4 explains a method by which ALL may be mapped to EWL. FIG. 4 shows a graph 400 that plots, for a plurality of sample lines of many different lengths, the EWL and the ALL. Curve 410 shows the actual measured data plotted out. Curve 410 is generally a straight line, indicating that there is a high correlation between ALL and EWL.

Curve 412 represents a linear approximation of 410. It is a first order approximation, but provides a good approximation. In the example for which data was collected, the mapping was found to be approximately 2,000 feet (0.6 kilometers) per 10 dB of ALL. Therefore, if the ALL was computed to be 40 dB, the computer in service center 118 might report an EWL of 8,000 feet (2.4 kilometers).

Once an EWL is provided, this value may be processed as is previously known. One advantage of reporting the value as EWL is that EWL is already a known standard and tools exist to evaluate lines based on their EWL.

EXAMPLE

A plurality of sample lines were tested. Three different methods were used to predict their performance. In the first case, a known capacitive technique was used to predict the length of the line. In the second case, the insertion loss of the line was predicted at a single frequency, here 300 kHz. In the third case, the average loop loss was computed as described above.

Figure 5A:
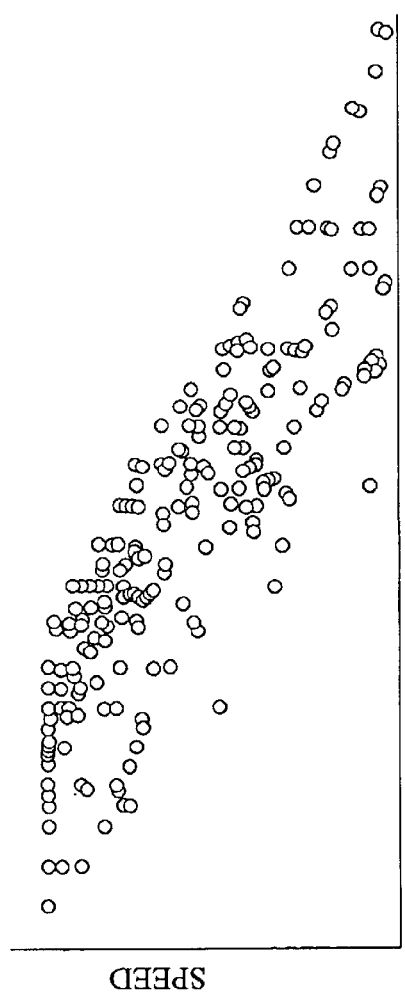
FIGS. 5A to 5C are graphs illustrating improved performance of a system using the invention.
Figure 5B:
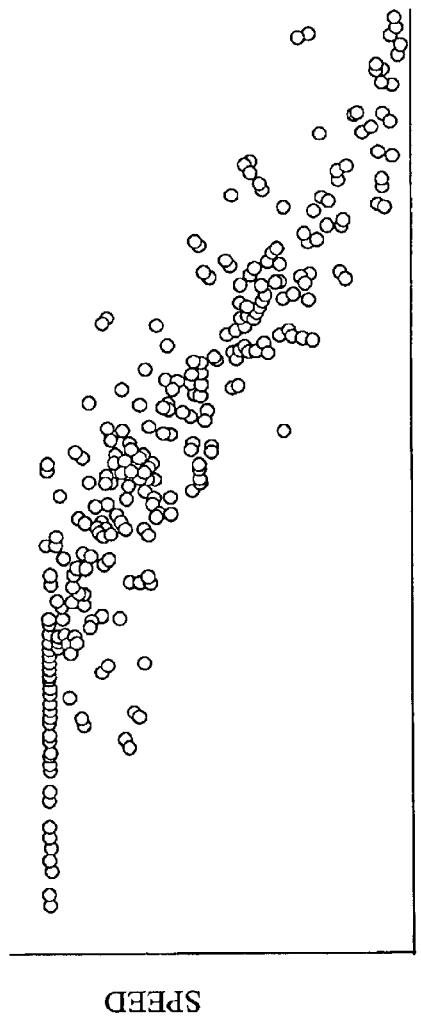
Figure 5C:
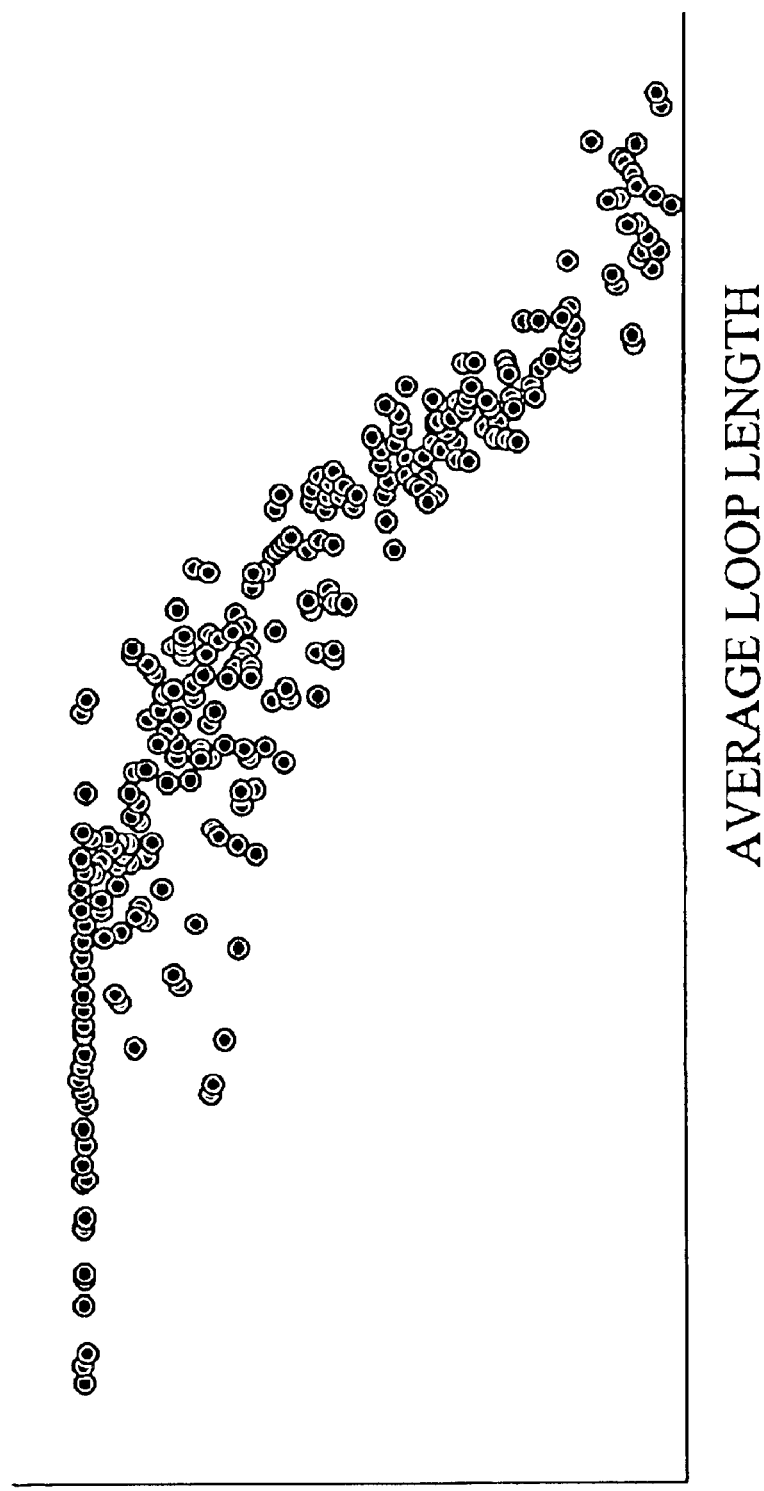

In each case, the actual modem speed was measured on each line. The modem speed measurements were paired with each predictor of line performance. FIG. 5A shows this data graphically where the performance predictor is the length measurement. FIG. 5B shows this data graphically where the performance predictor is the loss at a single frequency. FIG. 5C shows this data graphically where the performance predictor is ALL.

The graph in FIG. 5A has points that are more spread out than the other two. Points that are spread out have a low correlation coefficient. For the sample set used in the example the correlation factor was 0.82. Such a correlation factor indicates that there is a relationship between the measured length and performance. However, a correlation factor less than 1 indicates that the correlation is not perfect, meaning that variability should be expected in the actual results compared to the prediction. The amount of variability is larger for correlation coefficients that are further from 1.

FIG. 5B shows that single frequency insertion loss should provide less variability, and therefore more accurate predictions. In the graph of FIG. 5B, the data points are less dispersed. This data set has a correlation coefficient of 0.91. Therefore, this data shows single frequency insertion loss is a better predictor of actual line performance than a capacitive measure of the length of the line.

FIG. 5C shows that using the ALL technique describes above provides a data set with even less dispersion. The correlation coefficient of this data set is 0.95. Therefore, the data indicates that a technique using the invention provides less variability and therefore improved performance predictions.

Advantageously, a technique according to the invention provides an improvement over the prior art techniques. It computes EWL, taking into account attenuation in the line at very high frequencies. Yet, the measurements needed for this computation are taken at relatively low frequency, allowing them to be made through a switch or other low frequency component. We have noticed that using ALL to qualify a line is more accurate than predicting performance based on an estimate of attenuation at a single frequency. And, the improvement is particularly noticeable on lines that contain bridged taps. This is significant in networks such as North and South America where approximately 70% of the loops have bridged taps.

The system and method described herein is therefore particularly useful in connection with an established telephone network in which the network operator wishes to provide DSL service.

Alternatives

Having described one embodiment, numerous alternative embodiments or variations can be made.

For example, it was described that a mapping was made by determining coefficients that map measurements in range 212 to attenuation at frequencies in range 214. Alternatively, the mapping could be made by describing the curves, or some subset of the curves, in FIG. 2 by an equation. The mapping could be made by finding the best fit between actual measurements taken on a line under test and one of the curves. The equation matching the selected curve could then be used to predict performance at the higher frequencies.

Also, it should be appreciated that the technique for ALL is used in connection with a line pre-qualification process. ALL might be useful in applications other than line qualification.

Further, it should be appreciated that specific numbers are given in connection with the description of the preferred embodiment. The specific numbers used for illustration herein related to ADSL service. However, the technique would also be useful for other types of services, such as VDSL. It should also be appreciated that these numbers are for illustration only. Actual numeric values for a fielded system would likely be developed from model lines representative of the lines in the system.

Figure 3A:
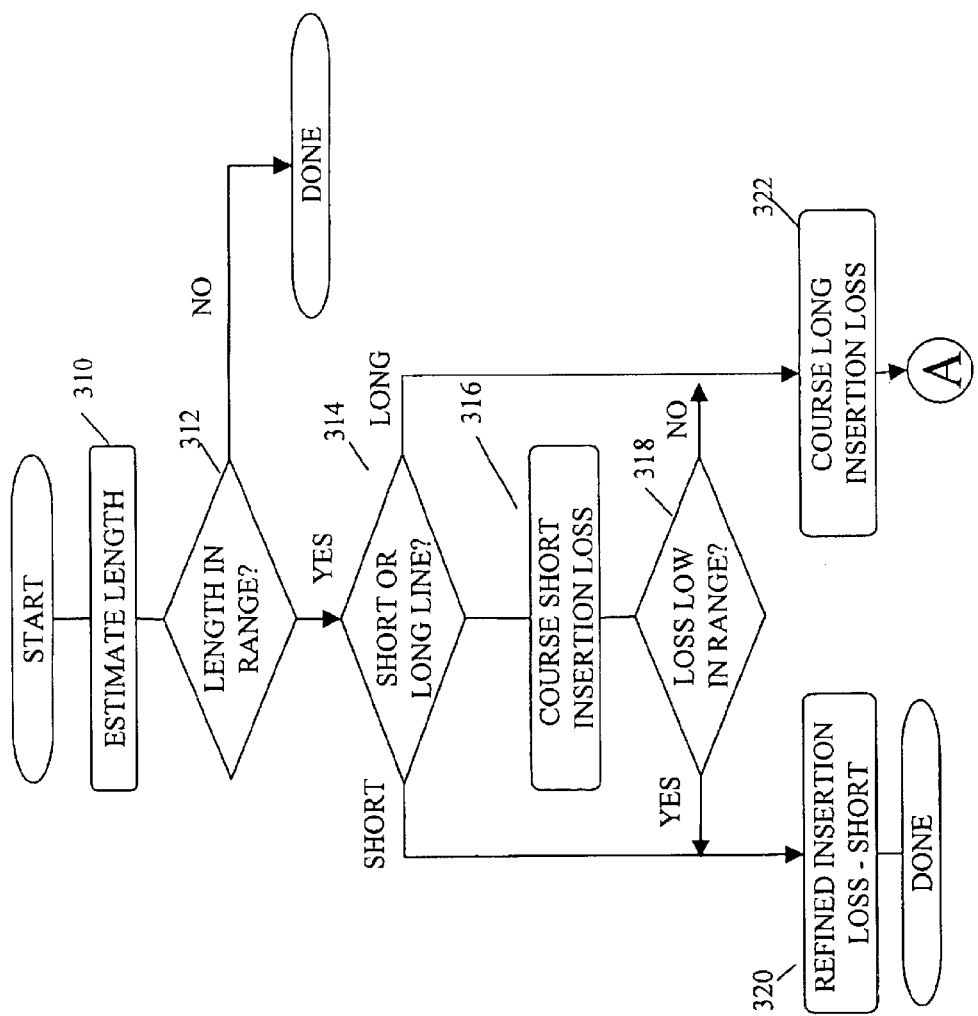
FIGS. 3A and 3B are a flow chart illustration a method of determining loop loss that uses the invention.
Figure 3B:
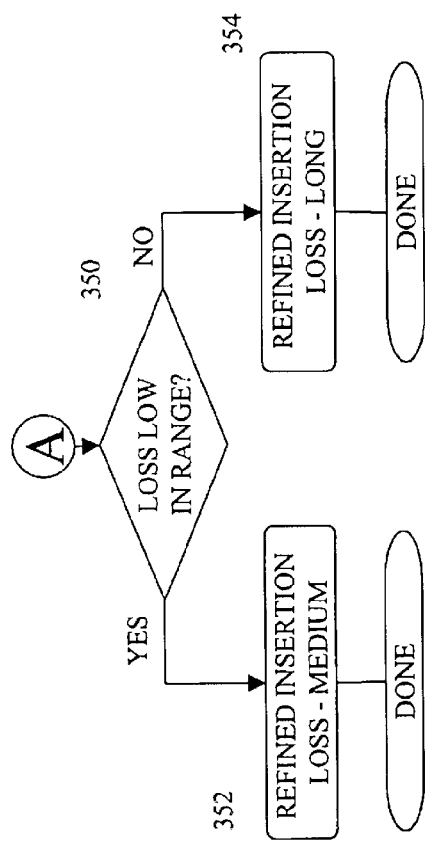

As another example, FIGS. 3A and 3B describes a process of binning lines into one of three performance bins based on course estimates of either the line length or attenuation. The number of bins and the specific thresholds used to distinguish between bins are for illustration only. A different number of bins or different thresholds might be used depending on the type of service or characteristics of the network in which a system incorporating the invention is installed.

As another variation, it should be appreciated that the prediction of the data rate and the qualification of the line need not be done as physically independent steps. For example, it was described above that an equation is used to determine ALL from measurements, which was then used to determine line qualification. The same sequence of steps might be performed in a table that maps measurements directly to a qualification state. In this case, the logical steps described above are performed when values are computed for inclusion in the table.

While the invention has been particularly shown and described with reference to the preferred embodiments thereof, it will be understood by those skilled in the art that various changes in form and detail may be made therein without departing from the spirit and scope of the invention.

What is claimed is:

1. A method of qualifying a line for high speed data services, comprising:
   a) measuring power dissipated in the line at a plurality of frequencies in a first range below a first frequency;
   b) mapping the measured power dissipations to a value representative of the average loss in the line over a second range of frequencies that extends to a second frequency, the second frequency being higher than the first frequency;
   c) using the value representative of the average loss to predict the data rate of signals transmitted in the second range; and
   d) qualifying the line for high speed data services when the predicted data rate exceeds a predetermined threshold.

2. The method of claim 1 wherein mapping to a value representative of the average loss includes:
   a) making a preliminary assessment of the length of the line;
   b) selecting coefficients based on preliminary assessment of the length of the line;
   c) using the selected coefficients to map the measured power dissipation to an average line length.

3. The method of claim 2 wherein making a preliminary assessment of the length of the line comprises assigning the line to one of a plurality of ranges of line length.

4. The method of claim 1 wherein the step of measuring power dissipated comprises driving the line in common mode and measuring the voltage across the line.

5. The method of claim 1 wherein measuring power dissipation comprises driving the line through a telephone switch connected to a plurality of subscriber lines in a telephone network.

6. The method of claim 1 used to qualify a line in a telephone network for DSL service.

7. The method of claim 6 wherein the DSL service is ADSL.

8. The method of claim 6 wherein measuring is performed on a measurement unit coupled to a telephone switch in the network.

9. The method of claim 8 wherein predicting the data rate is performed on a computer in a service center.

10. The method of claim 6 wherein the qualification of a line running to a subscriber premises is performed prior to the provision of high speed data services to that premises.

11. A method of qualifying a line under test for high speed data services, comprising:
    a) providing a plurality of model lines representing lines with different attenuation versus frequency characteristics in at least a lower frequency range and higher frequency range;
    b) dividing the plurality of lines into a plurality of groups;
    c) for each of the groups, developing a mapping between characteristics in the lower frequency and performance across the higher frequency range;
    d) taking a plurality of measurements on the line, including measurements of power dissipated in the line under test at a plurality of frequencies in the lower frequency range;
    e) using the measured values to select one of the groups and applying the measured power dissipation to the model developed for the selected group to predict performance of the line under test across the higher frequency range.

12. The method of claim 11 wherein providing a plurality of model lines comprises making two ended measurements on a plurality of lines.

13. The method of claim 11 wherein providing a plurality of model lines comprises performing calculations on a plurality of mathematical models of lines in a network.

14. The method of claim 11 wherein the lower frequency range comprises the pass band of a telecommunications switch in a network and the higher frequency range comprises the frequency range occupied by the downlink of a DSL service.

15. The method of claim 11 wherein the mappings are created in advance of the qualification of the line under test and stored in a computer linked to a measurement unit in the network containing the line under test.

16. The method of claim 11 wherein taking a plurality of measurements includes measuring the capacitance of the line under test and selecting one of the groups includes selecting groups includes selecting in part based on the measured capacitance.

17. The method of claim 11 wherein the performance across the higher frequency range comprises the average attenuation across the frequency range.

18. The method of claim 11 wherein the predicted performance includes the data rate for DSL service that can be supported on the line.

19. The method of claim 11 wherein the predicted performance includes an indication of the line under test can support DSL service at a predetermined level.

20. The method of claim 11 used to qualify a subscriber line in a telephone network for DSL services in a network having a switch coupled to a plurality of subscriber lines and a measurement unit switchably connected through the switch to any one of the plurality of subscriber lines and the measurement unit takes the plurality of measurements; wherein the network additionally comprises a computer linked to the measurement unit and the computer is programmed to predict the performance of a line under test linked to the measurement unit through the switch.

* * * * *